United States Patent [19]

Katz et al.

[11] Patent Number: 5,268,337
[45] Date of Patent: Dec. 7, 1993

[54] CERAMIC OXIDE POWDERS AND THE FORMATION THEREOF

[75] Inventors: Joseph L. Katz; Cheng-Hung Hung, both of Baltimore, Md.

[73] Assignee: The Johns Hopkins University, Baltimore, Md.

[21] Appl. No.: 793,569

[22] Filed: Nov. 18, 1991

[51] Int. Cl.⁵ .................... C04B 35/02; C01B 33/12
[52] U.S. Cl. ................................ 501/94; 501/153; 501/154; 423/337; 423/494; 423/495; 423/612; 423/618; 423/625
[58] Field of Search ........................ 501/94, 153, 154; 423/324, 325, 347, 385, 592, 593, 611, 612, 618, 631, 337, 494, 495, 625

[56] References Cited

U.S. PATENT DOCUMENTS

| | | | |
|---|---|---|---|
| 3,373,119 | 3/1968 | Krystyniak | 252/517 |
| 3,617,358 | 11/1971 | Dittrich | 117/105.2 |
| 4,367,919 | 1/1983 | Tung et al. | 350/105 |
| 4,508,667 | 4/1985 | Elliot | 264/13 |
| 4,564,556 | 1/1986 | Lang | 428/325 |
| 4,604,118 | 8/1986 | Bocko et al. | 65/3.12 |
| 4,605,594 | 8/1986 | Owens et al. | 428/373 |
| 4,767,429 | 8/1988 | Fleming et al. | 65/3.11 |
| 4,772,511 | 9/1988 | Wood et al. | 428/325 |
| 4,826,520 | 5/1989 | Kawazoe et al. | 65/3.12 |
| 4,891,339 | 1/1990 | Cakote et al. | 501/87 |
| 4,909,816 | 3/1990 | MacChesney et al. | 65/3.12 |
| 4,925,647 | 5/1990 | Kirchhöfer | 423/592 |
| 4,938,789 | 7/1990 | Tsuchiya et al. | 65/144 |
| 5,110,335 | 5/1992 | Miller et al. | 65/3.12 |
| 5,116,400 | 5/1992 | Abbott et al. | 65/144 |

FOREIGN PATENT DOCUMENTS

0133916 3/1985 European Pat. Off. .

Primary Examiner—Mark L. Bell
Assistant Examiner—Michael Marcheschi
Attorney, Agent, or Firm—Edwin T. Yates

[57] ABSTRACT

Ceramic oxide powders and a method for their preparation. Ceramic oxide powders are obtained using a flame process whereby two or more precursors of ceramic oxides are introduced into a counterflow diffusion flame burner wherein said precursors are converted into ceramic oxide powders. The morphology, particle size, and crystalline form of the ceramic oxide powders are determined by process conditions.

17 Claims, 13 Drawing Sheets

SIDE VIEW

FIG. 7
Increasing Residence Time and Increasing Temperature →

Increasing Residence Time and Increasing Temperature ⟶

| | Step I | Step II | Step III | Step IV | Step V |
|---|---|---|---|---|---|
| $SiO_2$-$GeO_2$ | $GeO_2$ particles | larger $GeO_2$ particles | $SiO_2$ condensed on $GeO_2$ | $GeO_2$ encapsulated by $SiO_2$ | particles of uniform composition |
| $Al_2O_3$-$TiO_2$ | $TiO_2$ and $Al_2O_3$ particles | chain-like structures | collapsed chains | or surface growth or aggregation | particles of uniform composition |

CERAMIC OXIDE POWDERS AND THE FORMATION THEREOF

The invention disclosed and claimed herein was made in the course of research funded under Department of Energy Grant No. DE-FG02-88ER45356.

This invention is broadly concerned with ceramic oxide powders and their method of preparation. More particularly, it is concerned with the formation of mixed ceramic oxide powders obtained using a flame process and which have well characterized size distribution, shape, purity, morphology, and crystalline form.

BACKGROUND OF THE INVENTION

Ceramic oxides and mixtures thereof find utility as catalysts, ceramics, optical fibers, pigments, and superconductors. Mixed oxide powders such as $SiO_2$-$Al_2O_3$, $Al_2O_3$-$TiO_2$, $TiO_2$-$V_2O_5$, $SiO_2$-$TiO_2$, $SiO_2$-$GeO_2$ and Y-Ba-Cu-O are used to produce catalysts, catalyst supports, ceramics, optical fibers, pigments, and superconductors. The degree of mixing of these ceramic oxides and their microstructures are critical to their reactivity, strength, refractivity, and electrical resistivity. Mixed ceramic oxides may be, for example, simple mixtures thereof, agglomerates, one ceramic oxide supported on another, or one ceramic oxide coated with another. The ceramic oxide may also be a compound formed from two different ceramic oxides, e.g., $Al_2O_3.TiO_2$. Mixed ceramic oxides are typically prepared, for example, by flame spraying mixed sols thereof or by coating a ceramic oxide by depositing it from a solution such as an aqueous silicate solution. These methods are characterized by difficulty in controlling the properties of the mixed ceramic oxide obtained.

SUMMARY OF THE INVENTION

Broadly, the compositions and method of this invention comprise ceramic oxide powders having well defined properties and a method for their preparation. More particularly, the invention is concerned with mixed ceramic oxide powders having utility as catalysts, catalyst supports, optical fibers, ceramics, pigments, and superconductors prepared using a counterflow diffusion flame burner. The invention is concerned further with compounds formed from two different ceramic oxides, e.g., $Al_2O_3.TiO_2$, which have utility as ceramic oxides of high strength and low thermal expansion coefficient. The ceramic oxide powders are formed in a counterflow diffusion flame burner using a fuel stream comprising a gaseous fuel and an inert gas diluent, and an oxidizing gas stream comprising oxygen and an inert gas diluent. The gaseous fuel may be, for example, hydrogen, methane, ethane, ethylene, acetylene, or mixtures thereof. The preferred fuel is hydrogen. The inert gas in both the fuel stream and the oxidizing gas stream may be, for example, nitrogen, one of the rare gases such as helium, neon, argon, krypton, xenon, or mixtures thereof. A convenient oxidizing gas stream is air which essentially comprises oxygen and nitrogen. The source materials, i.e., precursors, for the formation of ceramic oxide powders are, for example, $SiCl_4$, $AlCl_3$, $GeCl_4$, $TiCl_4$, $SiH_4$, $VOCl_3$, and $Al(CH_3)_3$. Two or more precursors are injected into the flame simultaneously to form the ceramic oxide powder. Depending on reaction conditions, the product may be a mixed ceramic oxide powder or a compound formed from two different ceramic oxides. Particle size, morphology, and crystalline form of the ceramic oxide powder may be varied by the choice of reaction conditions.

It is therefore an object of this invention to provide ceramic oxide powders having well defined properties and a process for their production.

It is another object of this invention to provide mixed ceramic oxide powders having utility as catalysts, catalyst supports, ceramics, optical fibers, pigments, and superconductors.

It is yet another object of this invention to provide powdered ceramic oxide compounds formed from two different ceramic oxides.

It is still another object of this invention to provide ceramic oxide powders by means of a counterflow diffusion flame process.

Yet other objects will be apparent to those skilled in the art.

The foregoing and other objects are accomplished by the practice of this invention. Broadly, viewed in one of its principal aspects, this invention consists of a process for the formation of a ceramic oxide powder comprising the steps:

1. Introducing into one end of a counterflow diffusion flame burner having a top end and a bottom end an oxidizing gas stream comprising $O_2$ and an inert gas;

2. Incorporating two ceramic oxide precursors into a fuel gas stream comprising a gaseous fuel and an inert gas;

3. Introducing said fuel gas stream containing the ceramic oxide precursors into the other end of said counterflow diffusion flame burner, and 4. Generating a flame in the region of the counterflow diffusion flame burner where the two opposed gas streams impinge whereby said ceramic oxide precursors are converted to ceramic oxide powder.

The ceramic oxide powders of this invention are produced by the practice of the foregoing process. Thus, one aspect of this invention consists of a ceramic oxide powder produced by the steps:

1. Introducing into one end of a counterflow diffusion flame burner having a top end and a bottom end an oxidizing gas stream comprising $O_2$ and an inert gas;

2. Incorporating two ceramic oxide precursors into a fuel gas stream comprising a gaseous fuel and an inert gas;

3. Introducing said fuel gas stream containing the ceramic oxide precursors into the other end of said counterflow diffusion flame burner, and 4. Generating a flame in the region of the counterflow diffusion flame burner where the two opposed gas streams impinge whereby said ceramic oxide precursors are converted to ceramic oxide powder.

The instant invention thus provides ceramic oxide powders having a desired particle size, morphology, and crystalline form, and a process for their formation. More particularly, this invention provides ceramic oxide powders formed by a process wherein two ceramic oxide precursors are introduced into a counterflow diffusion flame burner whereby said precursors are converted to ceramic oxide powder. The ceramic oxide powder thus produced may be, depending on reaction conditions, small particles of one oxide adhering to larger particles of the other, uniform coating of one oxide onto particles of another, multicomponent particles of uniform composition, or compounds of the two ceramic oxides. Depending on the composition, particle size, crystalline form, and morphology of the ceramic oxide, it may have utility as a ceramic, an optical fiber, a catalyst, a catalyst support, a pigment, or a paint opacifier. The nature and substance of the present invention as well as its objects and advantages will be more clearly perceived and fully understood by referring to the following description and claims taken in connection with the accompanying drawings which are described briefly below.

DESCRIPTION OF THE PREFERRED EMBODIMENTS

This invention is characterized by ceramic oxide powders having unique properties and a method for their preparation. More particularly, the invention is concerned with ceramic oxide powders formed by a flame process in a counterflow diffusion flame burner from two or more precursors. By varying reaction conditions, it is possible to control particle size, morphology, and crystalline form of the ceramic oxide powders. The flame conditions, e.g., temperature and gas flow rate, and precursor concentration ratios are parameters which determine the ceramic oxide particle growth processes. A strong temperature dependence is apparent.

Figure 1A:
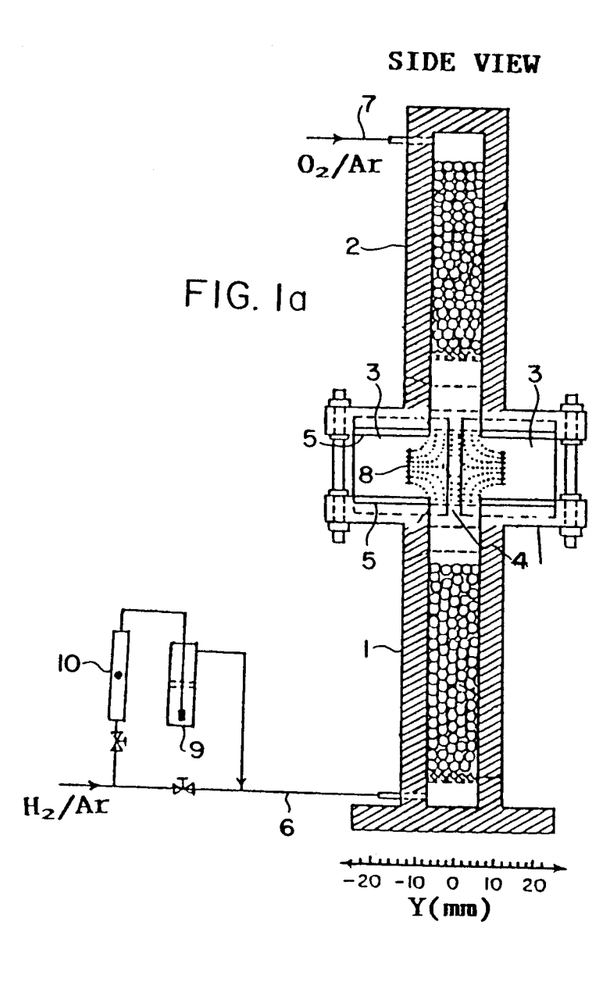
FIG. 1(a) is a side view of the rectangular counterflow diffusion flame burner used to produce the ceramic oxide powders of the invention.
Figure 1B:
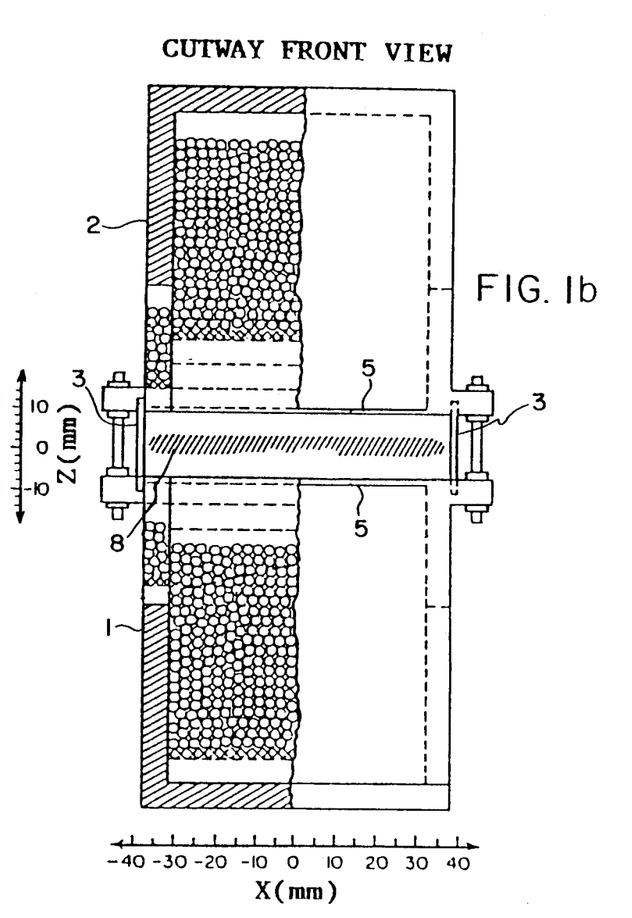
FIG. 1(b) is a front view of the rectangular counterflow diffusion flame burner used to produce the ceramic oxide powders of the invention.

FIG. 1(a) and FIG. 1(b) depict, respectively, cutaway side view and cutaway front view of the rectangular counterflow diffusion flame burner used in the practice of the invention. The burner consists of a lower vertical tube 1 and an upper vertical tube 2 of rectangular cross section separated by a distance of 15 mm. Each tube consists of three channels, a central main channel and two side channels. Two pairs of flat fused silica plates 3 connect the outsides of the two side channels of the two opposed tubes, thus forcing the combustion gases to flow out only through the front and back. A 4 mm gap 4 between each pair of plates allows one to send light beams down the burner without significantly affecting the flow. Flanges 5 fitted to both the top and the bottom of the burner minimize entrainment of surrounding air and keep the gas flow parallel to the burner surfaces. The fuel stream (gaseous fuel diluted with inert gas) is conducted through conduit 6 into the lower tube 1 and flows upward. The oxidizing gas stream ($O_2$ diluted with inert gas) is conducted through conduit 7 into upper tube 2 and flows downward. A flame 8 is generated in the region where the two opposed gas streams impinge. Flame 8 is very flat and uniform in the horizontal plane, i.e., the X-Y plane. The X, Y and Z axes are shown in FIG. 1(a) and FIG. 1(b); all have their zero at the geometric center of the burner.

The basic geometric characteristics of the flow field are illustrated in FIG. 1(a) and FIG. 1(b). The advantage of this geometry is that the gas flow along the stagnation streamline, i.e., Y=0, is essentially one dimensional. The temperature and particle size of the ceramic oxide powders can thus be accurately measured using optical methods. All measurements, e.g., temperature, particle size, and light scattering intensity, are made along this streamline. Precursors of the ceramic oxides, which in the embodiment depicted in FIGS. 1(a) and 1(b) are liquid at room temperature, are added to the flame by bubbling a small part of the fuel stream through gas washing bottle 9 containing the appropriate liquids. Precursor concentrations are calculated using their known vapor pressures and measurements of their flow rates made using gas flowmeter 10. By precursor is meant the source material, e.g., $SiH_4$, $SiCl_4$, $TiCl_4$, $VOCl_3$, $GeCl_4$, $Al(CH_3)_3$, which after combustion results in the formation of a ceramic oxide powder. By concentration is meant the ratio of moles of precursor to moles of all gases in the fuel stream. To prevent their premature decomposition, the precursors are added to the fuel stream feeding the bottom tube 1 of the furnace which is cooled by circulating water rather than to upper tube 2 which is heated by the rising hot exhaust gases.

To reach the fuel, the $O_2$ needed for the formation of the ceramic oxide particles diffuses down through the stagnation plane, i.e., the horizontal plane in the center of the burner where the two opposed gas streams impinge. Excess $O_2$ is used, thus minimizing the production of incompletely oxidized particles.

While FIGS. 1(a) and 1(b) show the preferred embodiment where the oxidizing gas stream enters the burner at the top and the fuel gas stream containing the precursors enters at the bottom, it will be understood that the fuel gas stream containing the precursors may enter the burner at the top and the oxidizing gas stream may enter at the bottom.

The precursors are usually volatile liquids at room temperature, but it is possible for solid precursors to be used in the practice of this invention. For example, $AlCl_3$ has a sufficiently high vapor pressure that it may be vaporized by heat and the vapors incorporated into the fuel gas stream.

Figure 2:
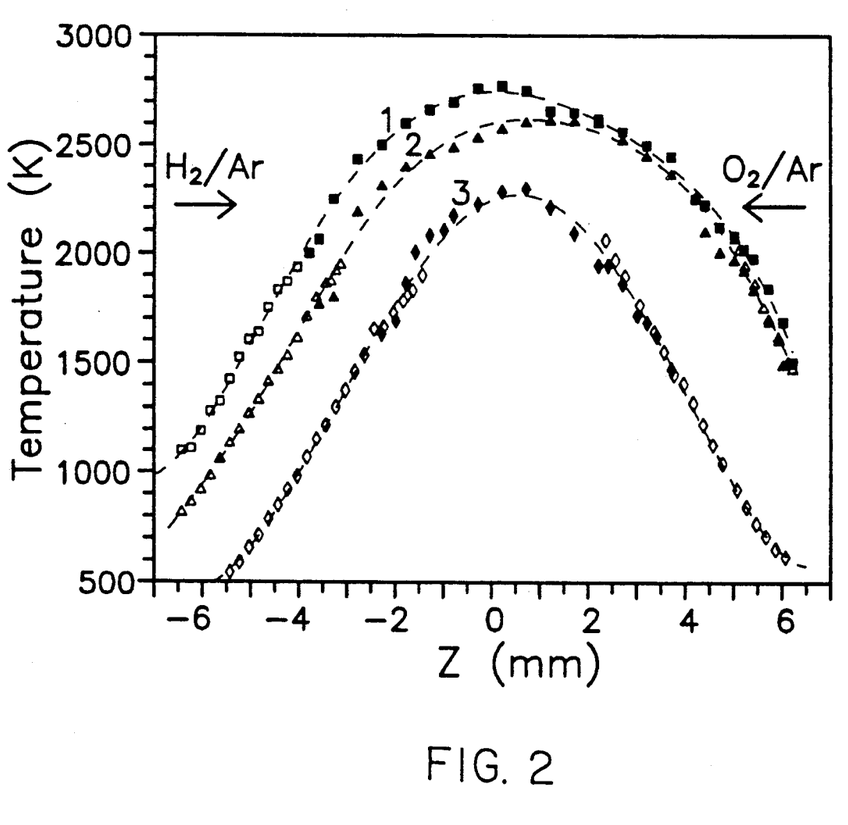
FIG. 2 depicts temperature profiles as a function of height in the diffusion flame burner.

The flame temperature is measured using two different techniques with overlapping ranges. Above 1500K, the rotational fine structure in the UV absorption spectra of .OH is measured, thus determining the distribution of the ground state population of .OH and, from it, their rotational temperature. Below 2000K, silica coated Pt-Pt10% Rh thermocouples are used with correction for radiation losses. FIG. 2 shows the temperature profiles for three actual flame conditions, measured by both the optical method (solid symbols) and using thermocouples (open symbols). The temperature of the flame is plotted on the vertical axis and the horizontal axis is the Z axis of the burner. The flames are preferably $O_2$ rich, e g., about 30% excess $O_2$, with momentum ratios of about 0.8. The momentum ratio is the ratio of the momenta of the fuel to the oxidizer streams. This set of conditions places the temperature maximum about 1 mm above the center of the burner on the Z axis while placing the stagnation plane about 2 mm below the center of the burner on the Z axis. Three different sets of conditions are depicted in FIG. 2. They are shown as flames 1, 2, and 3. These flames exhibit linearly increasing and almost identical temperature gradients in the range along the Z axis of from about −6 mm to about −2 mm, the region where all ceramic oxide particle formation processes occur. Flames 1 and 3 have the same gas velocities and thus the same residence times after correcting the velocity for their temperature differences. Flame 2 has a gas velocity 1.5 times that of flames 1 and 3.

Particle size and morphology were determined using a high resolution transmission electron microscope providing magnifications as high as 1,200,000 and having a point-to-point resolving power of 3 Å. A thermophoretic sampling method was used to collect particles directly onto carbon coated transmission electron microscopy grids. The sampling probe was designed to minimize disturbance to the flame. The probe was driven in and out of the flame in a total travel time of about 0.1 second by a double acting air cylinder. The transit times were much smaller than the length of time the tip of the probe was stationary at the center of the burner. Accordingly, almost all particles which impinged on the transmission electron microscopy grid did so at the center of the burner. The thermophoretic probe assembly was adjusted so that the surface of the transmission electron microscopy grid lay exactly in the center of the laser light beam used to measure light scattering, thus ensuring that the in-situ particle size measurements made using dynamic light scattering and particle size measurements determined from the transmission electron micrographs were for particles at the same location in the burner. A photomultiplier at 90° to the argon ion laser beam was used to measure the light scattering intensity. The laser light beam was chopped at 1035 Hz by a mechanical chopper. Cross polarization scattering was eliminated by using a polarizer. Since large particles scatter light much more strongly than small particles, the particle sizes obtained by light scattering measurements were usually larger than those measured by transmission electron microscopy.

Figure 3:
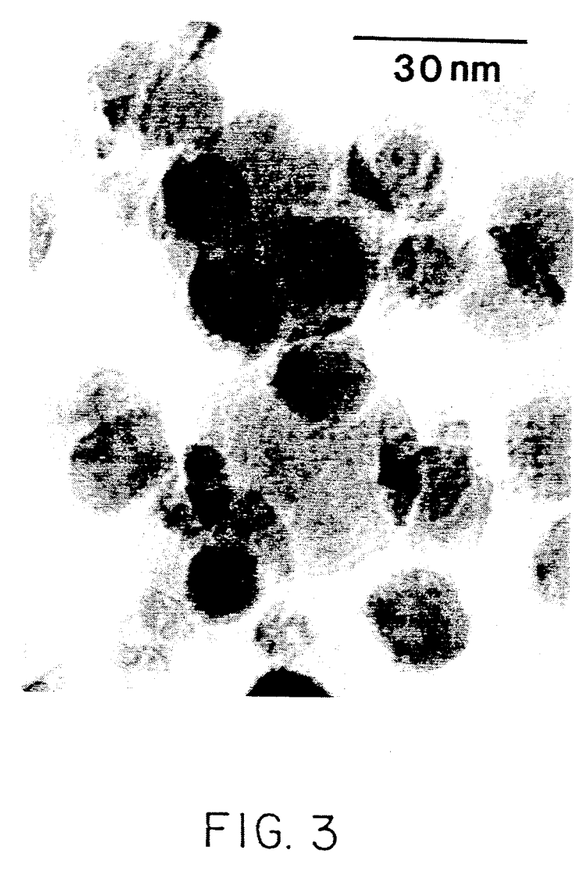
FIG. 3 is a transmission electron micrograph showing smaller $SiO_2$ particles attached to larger particles of $TiO_2$.

Scattering intensities were determined in flame 1, the hottest flame depicted in FIG. 2, about 1000K to 2600K in the particle formation and growth region, using $TiCl_4$, $SiCl_4$, and their mixtures as precursors. It was found that scattering in the −6.5 to −5 mm region along the Z axis came almost entirely from $TiO_2$ particles. However, in the −5 to −2 mm region along the Z axis, light scattering for the mixture was much stronger than for either pure component. A transmission electron micrograph of the mixture sampled at −4.5 mm along the Z axis (about 1800K) using a $SiCl_4$ to $TiCl_4$ concentration ratio of 1.5:1 is shown in FIG. 3. $SiH_4$ may be substituted for $SiCl_4$. FIG. 3 depicts $TiO_2$ particles with attached $SiO_2$ particles. The presence of additional $SiO_2$ particles, not attached to any $TiO_2$ particles, suggests that the $SiO_2$ particles formed by homogeneous nucleation. The electron diffraction pattern showed that the $SiO_2$ was amorphous and the $TiO_2$ was rutile. In the peak scattering intensity region at −3.3 mm on the Z axis, larger clusters were formed consisting of $TiO_2$ connected and partially covered by $SiO_2$. Above −3.0 mm, where the temperature was higher than the melting temperatures of $SiO_2$, $TiO_2$, and their composite (about 2000K, about 2300K, and about 2060K, respectively), the particle size decreased due to sintering and melting. A transmission electron micrograph of a sample taken at these conditions showed smaller $TiO_2$ particles, similar to those shown in FIG. 3 but connected by a matrix of $SiO_2$.

Figure 4:
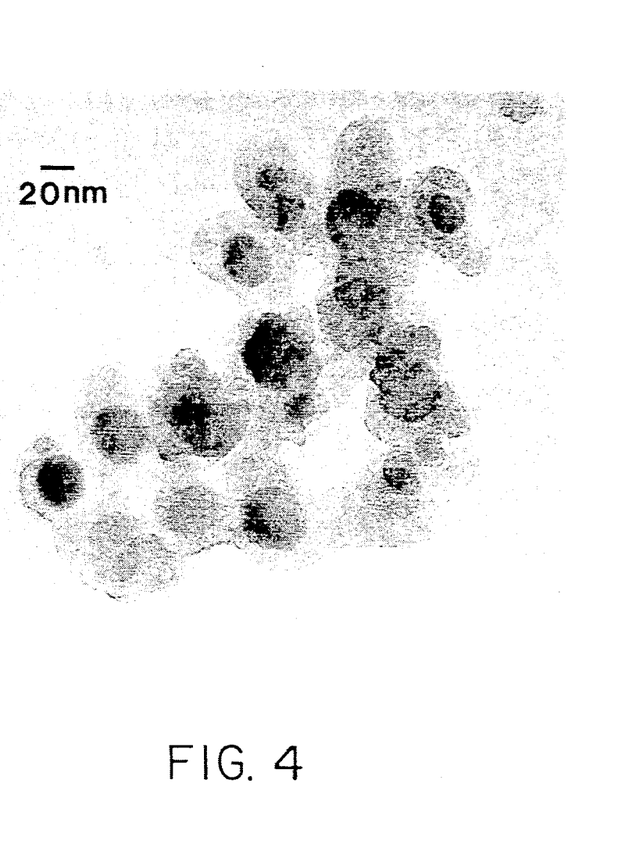
FIG. 4 is a transmission electron micrograph of $TiO_2$ particles coated with $SiO_2$.

Flame 3, the lowest temperature flame shown in FIG. 2, has a temperature gradient similar to that of flame 1, but its temperatures are about 900K lower at the same location along the Z axis, and its particle formation and growth region is in the range −6 to −1.5 mm along the Z axis, i.e., at temperatures between about 500K and 2000K. It was found that particles form in the −6 to −5 mm region where the temperature is about 500K. At higher temperatures, around −3 mm, the formation of $SiO_2$ particles was evidenced by an increase in the scattering intensity. In the peak scattering intensity region (−2.2 mm along the Z axis, about 1600K), chain-like $SiO_2$ particles were deposited onto the surface of spherical $TiO_2$ particles when the $SiCl_4$ to $TiCl_4$ concentration ratio was 1.5:1. A transmission electron micrograph of the material collected in this region is shown in FIG. 4. The black spots are $TiO_2$ particles, 30-38 nm in diameter, and the coating layer is $SiO_2$ 10-30 nm thick. The electron diffraction pattern showed that the $TiO_2$ was rutile and the $SiO_2$ was amorphous. This material is useful as a white pigment and is expected to have utility as a catalyst.

Figure 5:
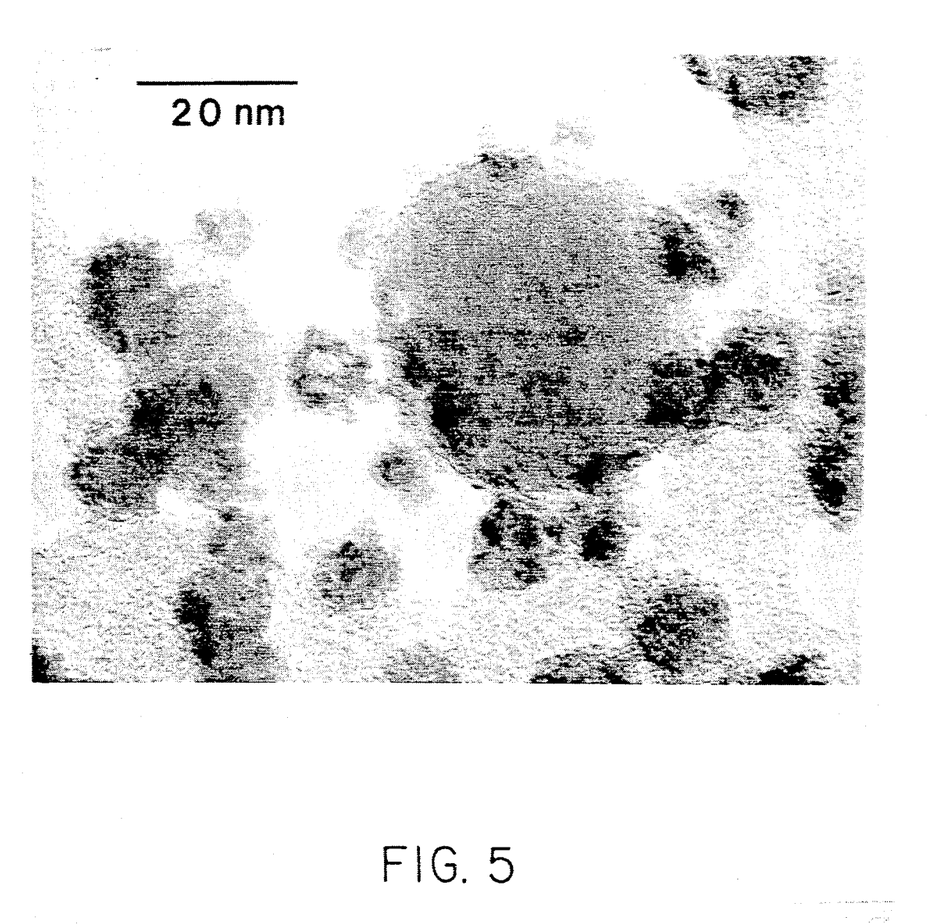
FIG. 5 is a transmission electron micrograph showing $SiO_2$ attached to $TiO_2$.
Figure 6:
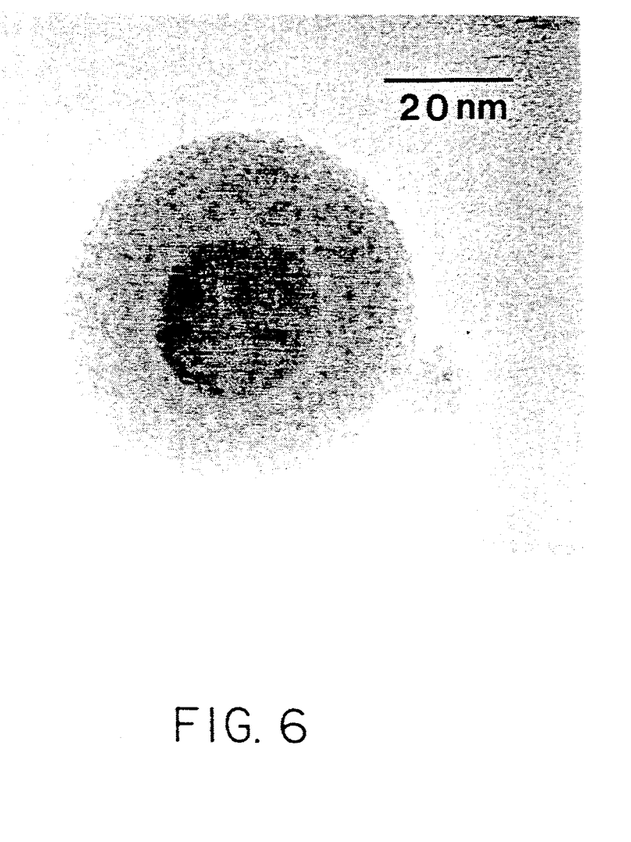
FIG. 6 is a transmission electron micrograph of $TiO_2$ coated with $SiO_2$.

The effect of precursor concentration ratios was studied using flame 2 depicted in FIG. 2 where the temperature is about 700K to 2300K in the particle formation and growth region, and various concentrations of $SiCl_4$ and $TiCl_4$. The $SiCl_4$ concentration may be varied, for example, from 0.001% to 0.06% while the $TiCl_4$ concentration is constant at 0.02%. The $SiCl_4$ to $TiCl_4$ concentration ratio thus may vary from about 0.05:1 to 3.0:1. At a concentration ratio of 0.15:1, the number density of $SiO_2$ particles was too low to cover the $TiO_2$ particles, thus, $TiO_2$ particles covered with discrete $SiO_2$ particles were obtained at 1800K as shown in FIG. 5. This morphology is similar to that shown in FIG. 3, except that particle sizes were smaller when high gas velocity flame 2 was used. The mixed ceramic oxide powder shown in FIG. 5 is anticipated to be useful as a catalyst. Increasing the $SiCl_4$ to $TiCl_4$ concentration ratio to 1.0:1 resulted in a layer of $SiO_2$ covering each $TiO_2$ particle obtained at 1800K as shown in FIG. 6. The mixed oxide powder of FIG. 6 was compared with that of FIG. 4. It is seen that increasing the gas velocity, the case with the mixed oxide powder of FIG. 6, results in thinner coating layers and smaller diameter central particles. Increasing the $SiCl_4$ to $TiCl_4$ concentration ratio to 3.0:1 resulted in a layer of $SiO_2$ 15 to 40 nm thick covering each $TiO_2$ particle. The structure was similar to that shown in FIG. 4, but the thickness of the $SiO_2$ coating was less uniform.

Figure 7:
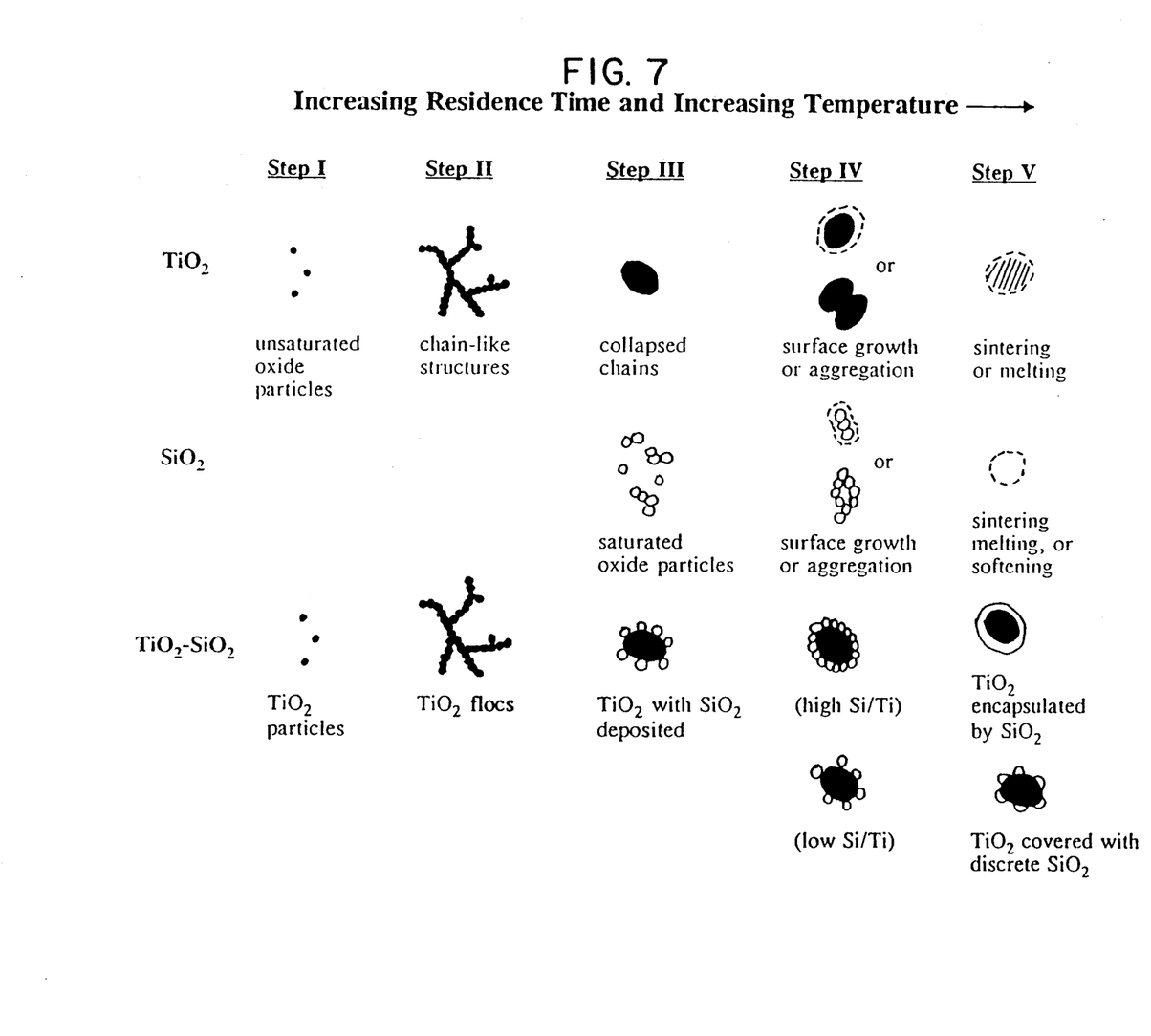
FIG. 7 is a schematic of the particle growth processes for $TiO_2$, $SiO_2$, and $TiO_2$-$SiO_2$.

The morphology of the mixed oxide particles is the result of collision, coagulation, and fusion between two oxides. FIG. 7, a schematic sketch of particle morphology as a function of residence time and temperature, depicts the differences in growth mechanism between $TiO_2$ and $SiO_2$. $TiO_2$, unlike $SiO_2$, condenses at a location where the temperature is much lower than its melting temperature. It forms as small particles of less fully oxidized oxides and loosely agglomerates into large, open flocs, resulting in the first scattering peak (steps I and II). As these flocs move upward into regions of higher temperature, they compact into much smaller, more nearly spherical particles (step III). This compaction causes a strong drop in light scattering intensity. Surface growth and aggregation cause continued growth of the particles and a resulting increase in the scattering intensity (step IV). A second drop in intensity occurs when the particles melt (step V). With $SiO_2$, open agglomerates do not appear. Since the particles form around their melting or softening temperature, as they agglomerate they form short chain-like structures (step III). Further surface growth and aggregation lead to a continuing increase in the scattering intensity (step IV), until a strong decrease occurs because the particles melt or soften (step V). These key differences have important implications for the types of mixed oxide particle morphologies that can be produced.

The formation mechanisms for $TiO_2$-$SiO_2$ mixed oxide particles are also shown in FIG. 7. $TiO_2$ forms and condenses into particles at a much lower temperature than $SiO_2$. The $TiO_2$ particles first form flocs. With increasing temperature, the flocs collapse into condensed particles. When $SiO_2$ particles condense, some deposit onto the condensed $TiO_2$ particles (step III). If the number of $SiO_2$ particles is sufficient to cover the $TiO_2$ particles, a coating structure can be obtained. Otherwise, a spotty deposition or a partial coating structure will result.

Three possible mechanisms for the formation of a coating layer are (a) particles of one oxide deposit onto the surface of the other oxide, then melt and flow along the surface to cover the entire particle; (b) one oxide heterogeneously condenses on the surface of the other; (c) particles of one oxide deposit uniformly onto the surface of the other oxide, and then fuse into a smooth coating layer. At low Si to Ti ratios, only $TiO_2$ particles with discrete $SiO_2$ particles attached were observed. At high Si to Ti ratios, $SiO_2$ coating layers were formed whose thicknesses (10 to 30 nm) were about the same as the diameters (10 to 25 nm) of the individual $SiO_2$ particles. Since a coating layer less than 10 nm was never found, it suggested that mechanism (c) is the dominant one, i.e., uniform deposition followed by fusion of the particles.

The differences in the morphologies of mixed oxide particles caused by forming them at different temperature ranges can be seen by comparing FIGS. 3 and 4. At high temperature ranges (FIG. 3), one sees discrete $SiO_2$ particles attached onto the $TiO_2$ particles while at low temperature ranges (FIG. 4), one sees that the $TiO_2$ particles are encapsulated by $SiO_2$. At high temperature ranges, spherical $SiO_2$ particles and $TiO_2$ agglomerates form. Since the sizes of the fundamental particles of $TiO_2$ and $SiO_2$ are about the same, the number of $SiO_2$ particles required to cover each $TiO_2$ particle is small. However, at a Si to Ti ratio of 1.5:1, the number of $SiO_2$ particles available is not sufficient to cover the surface of each $TiO_2$ particle, resulting in $TiO_2$ particles with discrete $SiO_2$ particles deposited on them. In contrast, at low temperature ranges, chain-like $SiO_2$ and nearly spherical $TiO_2$ particles are produced. The size of the $SiO_2$ fundamental particle is much smaller than in the high temperature range flame. Thus, there is enough $SiO_2$ to cover the surface of each $TiO_2$ particle. Because the $SiO_2$ coatings are glassy and easily flow into each other, these particles agglomerate into chains.

The morphology of mixed oxide particles also depends on the Si to Ti concentration ratio. At low Si to Ti ratios, there are insufficient $SiO_2$ particles produced to cover the $TiO_2$ particle surfaces. At high Si to Ti ratios, $SiO_2$-coated $TiO_2$ particles are formed. However, the thickness of the coating layer is not simply proportional to the amount of $SiO_2$ added. Using a medium temperature flame and a Si to Ti ratio of 1:1, a relatively uniform coating about 14 nm thick, as shown in FIG. 6, was obtained. However, at a Si to Ti ratio of 3.0:1, coating layers 15 to 40 nm thick, which were not uniform, were obtained. One possible explanation is that the $SiO_2$ particles deposit onto the surface of $TiO_2$ but do not spread out to become a uniform layer because of their high viscosity.

Thus, the morphology of the mixed oxide particles is controlled by the $SiCl_4$ to $TiCl_4$ concentration ratio, and the temperature range of the flame in the particle formation and growth region. Broadly, when the $SiCl_4$ to $TiCl_4$ concentration ratio is from about 1:1 to about 3:1 and the temperature range of the flame in the particle formation and growth region is from about 500K to about 2300K, the product is $TiO_2$ particles coated with $SiO_2$. When the $SiCl_4$ to $TiCl_4$ concentration ratio is from about 0.05:1 to about 1.5:1 and the temperature range of the flame in the particle formation and growth region is from about 1000K to about 2400K, the product is $TiO_2$ particles having discrete $SiO_2$ particles attached thereto.

Thus, by simultaneous combustion of $TiCl_4$ and $SiCl_4$, two useful morphologies were obtained, i.e., $TiO_2$ particles encapsulated by $SiO_2$, and $TiO_2$ particles with discrete $SiO_2$ particles attached. Several million tons of titanium dioxide pigment are produced each year by combustion generation of $TiO_2$ powders which are then coated with a layer of $SiO_2$ using silicate solutions. By use of the one step flame method of this invention, it is possible to produce these $TiO_2$ encapsulated by $SiO_2$ powders more economically and with less environmental difficulties. The powders with discrete particles of $SiO_2$ attached to $TiO_2$ are expected to find utility as catalysts or catalyst supports.

In addition to pigments and catalysts, the ceramic oxide powders of this invention may be used to form optical fibers and ceramics. An optical fiber consists of a core of a glass and an optical cladding of lower refractive index. Light propagates along the core by reflecting on the cladding. A mixed ceramic oxide powder of this invention is composed of two glass formers, $SiO_2$ and $GeO_2$, and may be used to prepare optical fibers. $SiO_2$ is the main component of the core and the cladding of the optical fiber. $GeO_2$ is the principal dopant added to the core to increase its refractivity. $SiO_2$-$GeO_2$ powders are traditionally obtained by the combustion of $SiCl_4$ and $GeCl_4$ in excess $O_2$ using vapor deposition methods, e.g., modified chemical vapor deposition or vapor phase axial deposition. The powders are deposited on a substrate tube or on a spinning rod to obtain a preform. The preform is then heated at about 1800K to remove OH and water. Finally, optical fiber is obtained by drawing the preform at high temperature. During this process, the formation of a very uniform mixture of $SiO_2$ and $GeO_2$ is essential to reduce transmission light losses. It should by noted that the modified chemical vapor deposition method is not a flame process and, while the vapor phase axial deposition method employs a diffusion flame burner, it does not employ the counterflow diffusion flame burner of the invention which permits precise control of the morphology, particle size and crystallinity of the ceramic oxide powder produced therein.

Much attention has been devoted to aluminum titanate, i.e., $Al_2O_3 \cdot TiO_2$, in the development of ceramic oxides of high strength and low thermal expansion coefficient. $Al_2O_3 \cdot TiO_2$ is usually prepared from a mixture of $Al_2O_3$ and $TiO_2$ powders which are ground and mixed in a ball mill or a mechanical mixer and then fired. The formation of defects during firing and sintering, mostly due to nonuniform mixing, is difficult to control by this conventional method. However, by combustion of $TiCl_4$ and $Al(CH_3)_3$ in accordance with the practice of this invention, and by arranging conditions so that the two oxide particles condense at the same time, a homogeneous mixture of $TiO_2$ and $Al_2O_3$ of extremely small particle size is obtained. Moreover, since the flame process of this invention provides an environment appropriate for the homogeneous mixture to sinter, it is possible to simplify $Al_2O_3 \cdot TiO_2$ formation from a multistage process to a single stage process.

The formation of $SiO_2$-$GeO_2$ powders was studied using flame 1 as shown in FIG. 2. The oxides were formed by adding the precursors $SiCl_4$ and $GeCl_4$ at the respective concentrations of 0.06% and 0.1%, a concentration ratio of about 1.7:1, to the fuel stream. However, $SiCl_4$ to $GeCl_4$ concentration ratios as low as about 0.05:1 may be used. The 90° light scattering and the dynamic light scattering were measured for the individual oxides and their mixture along the vertical axis of the burner, i.e., the Z axis. Particle morphology and crystalline form were examined on samples taken at key elevations in the burner and analyzed using a transmission electron microscope and an X-ray diffractometer.

Figure 8:
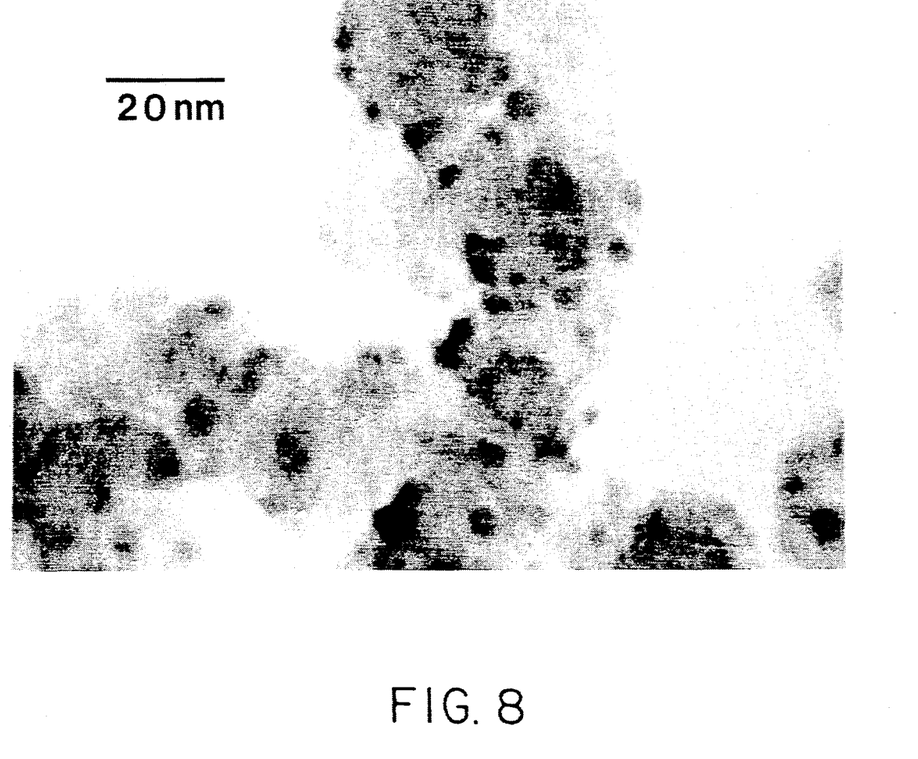
FIG. 8 is a transmission electron micrograph of $GeO_2$ with discrete $SiO_2$ attached.
Figure 9:
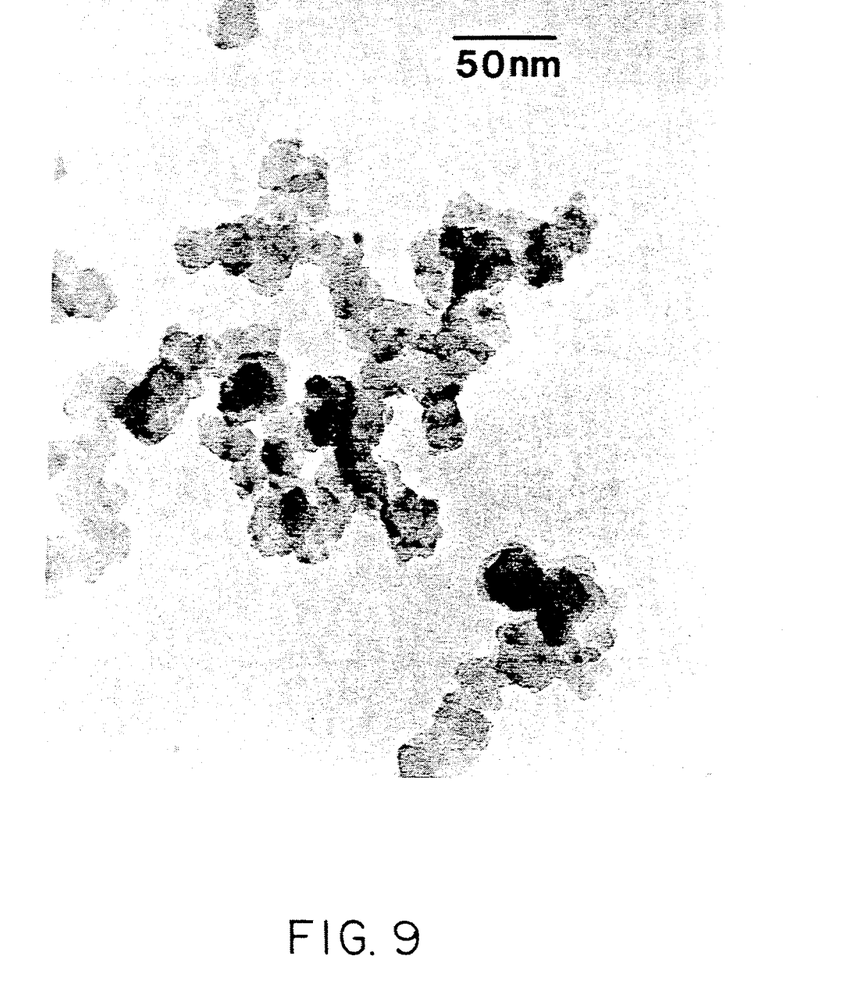
FIG. 9 is a transmission electron micrograph of a 1:1.6 mixture of $SiO_2$ and $GeO_2$.

The light scattering intensities as a function of elevation along the Z axis in the burner were determined when $GeCl_4$, $SiCl_4$ and a mixture of the two were added to the fuel stream. The light scattering intensity profile of the mixture was very different from that of $GeCl_4$ or $SiCl_4$ alone. It was much higher for the mixture and showed peaks at two different elevations in the burner. The first peak was observed at $-5.4$ mm along the Z axis (about 1400K). FIG. 8 is a transmission electron micrograph of a sample taken at this elevation which showed particles of $GeO_2$ covered with approximately 4 nm discrete $SiO_2$ particles. The presence of $SiO_2$ only on the surface of $GeO_2$ suggests that the $SiO_2$ formed by heterogeneous nucleation. After a growth stage up to $-5.4$ mm on the Z axis, the $GeO_2$ particles started to melt as they flowed into regions where the temperature was above their approximately 1350K melting temperature. The melting caused coalescence of the particles and was probably the reason the light scattering started to decrease sharply at $-5.4$ mm on the Z axis. The further deposition of $SiO_2$ increased the diameter of the particles, causing an increase of the scattering intensity which began at $-5.2$ mm on the Z axis. At about $-2.7$ mm on the Z axis (about 2400K), a second peak was encountered. The scattering intensity at this peak was too high to be due only to $SiO_2$. FIG. 9 is a transmission electron micrograph of particles collected at this elevation, a very uniform mixture of $GeO_2$ and $SiO_2$. The Ge to Si molar ratio, measured by analytic electron microscopy, was about the same as that in the feed, i.e., about 1.6:1. The electron diffraction pattern showed the mixture to be amorphous. It should be noted that, at $-2.7$ mm along the Z axis, the temperature is well above the melting temperatures of $GeO_2$ and $SiO_2$, approximately 1350K and 2000K, respectively. Thus, the sharp decrease in light scattering intensity observed after the second peak was probably due to the melting of the particles.

Particle size as a function of height in the burner was measured by dynamic light scattering when the mixture of $SiCl_4$ and $GeCl_4$ was added to the fuel stream. The diameter of the particles increased between $-6.1$ mm and $-3.9$ mm on the Z axis due primarily to surface condensation of $SiO_2$ onto $GeO_2$. The diameter of the particles remained almost constant from $-3.9$ mm to $-2.8$ mm on the Z axis. A sharp decrease in particle diameter above $-2.8$ mm on the Z axis was mainly due to coalescence and melting of the particles.

Figure 10:
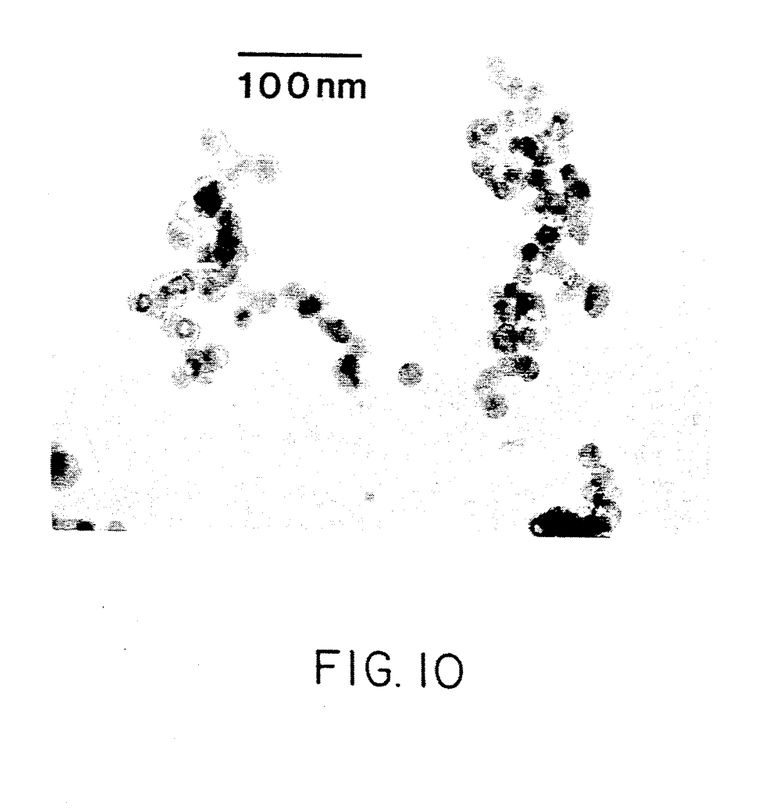
FIG. 10 is a transmission electron micrograph of a 1:1 mixture of $Al_2O_3$ and $TiO_2$.
Figure 11:
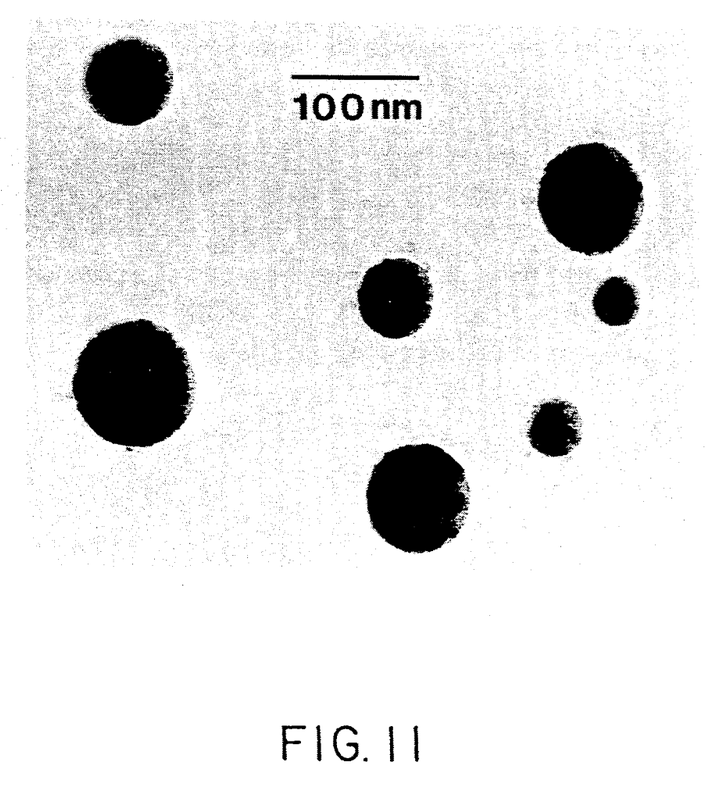
FIG. 11 is a transmission electron micrograph of a uniform mixture of $Al_2O_3$ and $TiO_2$.
Figure 12:
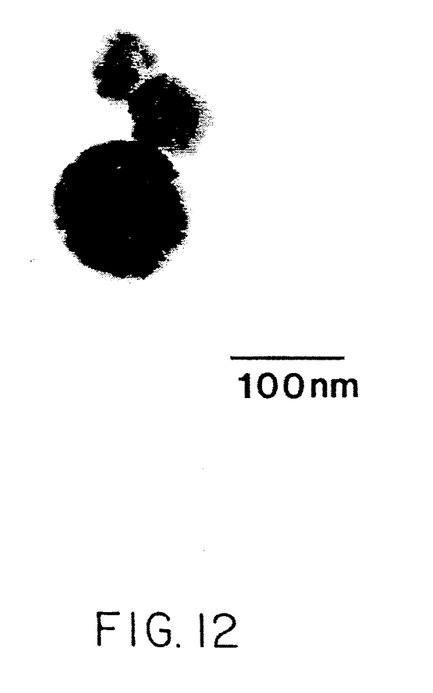
FIG. 12 is a transmission electron micrograph of a uniform mixture of $Al_2O_3$ and $TiO_2$.

Light scattering intensity as a function of elevation along the Z axis in the burner using flame 1 as shown in FIG. 2 was determined for a 1:1 mixture of $Al(CH_3)_3$ and $TiCl_4$. FIG. 10 is a transmission electron micrograph of a sample collected at $-5.7$ mm on the Z axis (about 1350K), the first scattering maximum. The sample had a chain-like structure consisting of approximately 10 nm particles. Analytic electron microscopy analysis showed that the particles had an Al to Ti mole ratio of 1:1, i.e., the same mole ratio as the feed. As they flowed upward in the burner, the chain-like structures compacted to form nearly spherical particles, causing a sharp decrease in scattering intensity. FIG. 11 is a transmission electron micrograph of a sample collected in this region, $-4$ mm on the Z axis (about 2000K). These particles were spherical and approximately 65 nm in diameter. Analytic electron microscopy on individual particles again showed an Al to Ti mole ratio of 1:1. Between $-4.5$ mm and $-2.8$ mm on the Z axis, the diameters of these spherical particles increased through surface growth and aggregation, causing a second increase in scattering intensity. A second peak occurred at $-2.8$ mm on the Z axis (about 2300K). FIG. 12 is a transmission electron micrograph of a sample taken at about the location of this second peak and shows particles which are larger, i.e., about 80 nm in diameter, than those shown in FIG. 11. The X-ray diffraction patterns on the sample of FIG. 12 showed three different crystalline phases: aluminum titanate, rutile, and $Al_2O_3$. As these particles flowed upward in the burner, they encountered temperatures which were higher than the melting temperatures of $Al_2O_3$, $TiO_2$, or their composite (2300K, 2100K, and approximately 2100K, respectively). They then coalesced and melted, causing a sharp decrease in light scattering intensity. The foregoing would apply for $Al(CH_3)_3$ to $TiCl_4$ mole ratios within the range of from about 1:1 to about 3:1. However, a mole ratio of about 1:1 is preferred.

Figure 13:
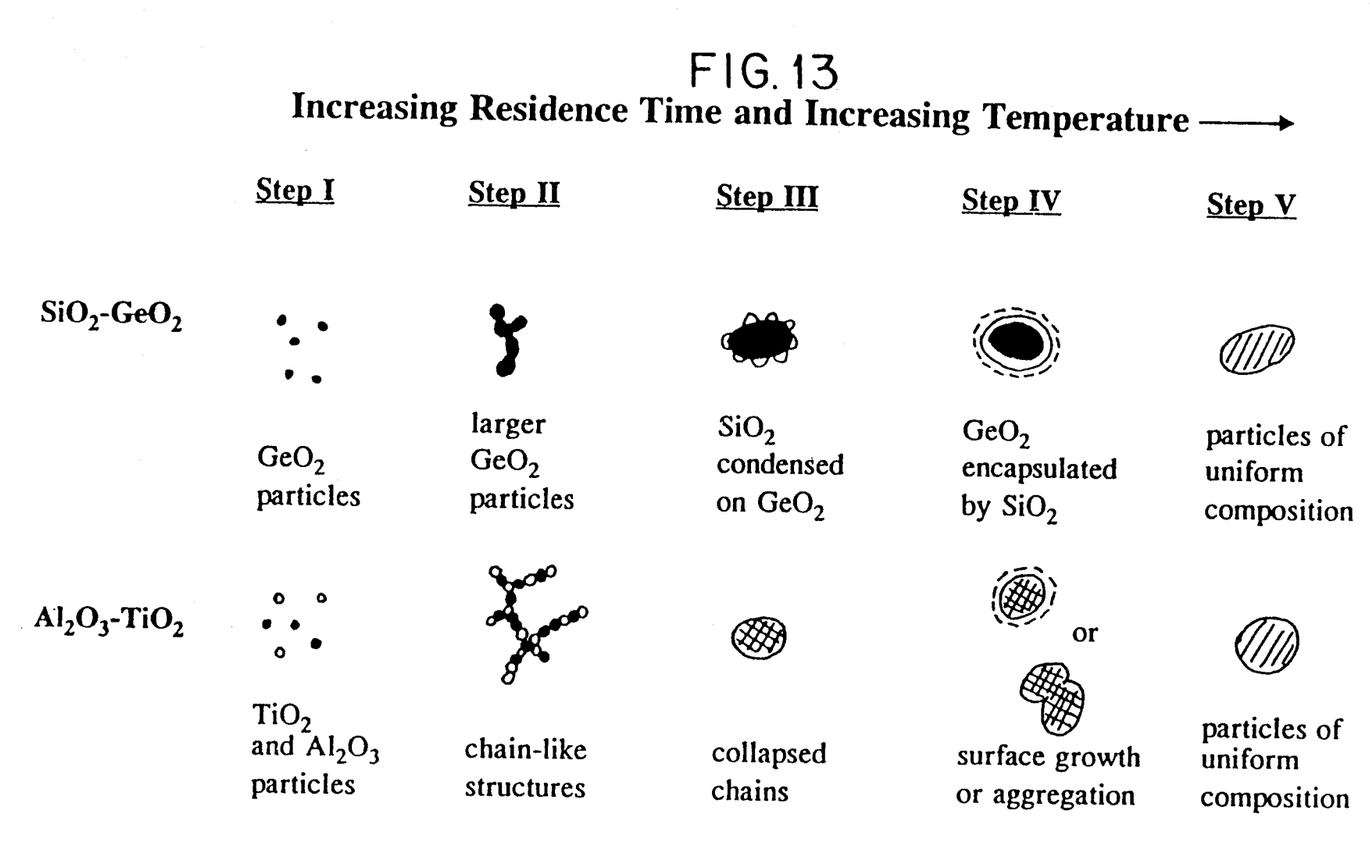
FIG. 13 is a schematic of the particle growth processes for $SiO_2$-$GeO_2$ and for $Al_2O_3$-$TiO_2$.

FIG. 13 is a schematic sketch of the mechanism for the formation of $SiO_2$-$GeO_2$ and $Al_2O_3$-$TiO_2$.

In the $SiO_2$-$GeO_2$ mixture, the first particles which form are pure $GeO_2$ (step I). As they nucleate, these $GeO_2$ particles agglomerate and form larger particles (step II). As they flow upward, the temperature increases and some $SiO_2$ nucleates heterogeneously on the surface of $GeO_2$, as can be seen in FIG. 8 (step III). It is likely that further deposition of $SiO_2$ gives rise to a coating of $SiO_2$ enclosing the $GeO_2$ particles (step IV). As the particles continue to flow upward and encounter temperatures higher than the melting temperature of the two oxides, their Si-Ge composition becomes very uniform (see FIG. 9 and step V in FIG. 13).

With $Al_2O_3$-$TiO_2$, both oxides form at the same elevation in the burner (step I). As they nucleate, they aggregate to form the chain-like structures shown in FIG. 10 (step II). As the chain-like particles flow upward into higher temperatures, they compact into nearly spherical particles of very uniform composition (step III). By surface growth and aggregation, the particle size increases (step IV). Aluminum titanate ($Al_2O_3$. $TiO_2$) forms at temperatures higher than about 1550K (step V). The diameters of aluminum titanate particles are very small, approximately 80 nm, compared to the diameters of aluminum titanate particles produced by traditional methods.

Thus, in its broadest sense, the instant invention provides ceramic oxide powders and a process for their preparation. The invention is particularly concerned with ceramic oxide powders formed from precursors in a counterflow diffusion flame burner. By varying process conditions, ceramic oxide powders having the desired particle size, morphology, and degree of crystallinity can be obtained. The nature of the ceramic oxide powder produced may be varied by the temperature of the flame, precursor concentration ratio, and gas velocity. The nature of the product is very temperature dependent. While the disclosure contained herein illustrates the different products obtained at different levels in the flame of the diffusion counterflow flame burner, and hence at different temperatures, it will be understood by those skilled in the art that by controlling flame temperature range in the particle formation and growth region, gas velocity, and precursor concentration ratio, a uniform ceramic oxide powder having the desired properties may be produced using the diffusion counterflow flame burner. Thus, by controlling the reaction conditions, the product may be a mixed ceramic oxide powder useful as a pigment, as a catalyst, as a catalyst support, as a ceramic, as a superconductor, or to produce an optical fiber. In addition, the ceramic oxide powder produced by the practice of the invention may be a compound formed from two different ceramic oxides.

While specific embodiments of the present invention have been shown and described in detail to illustrate the utilization of the inventive principals, it is to be understood that such showing and description have been offered only by way of example and not by way of limitation. Protection by Letters Patent of this invention in all its aspects as the same are set forth in the appended claims is sought to the broadest extent that the prior art allows.

We claim as our invention:

1. A process for the formation of a ceramic oxide powder comprising the steps:
   a. Introducing into one end of a counterflow diffusion flame burner having a top end and a bottom end an oxidizing gas stream comprising $O_2$ and an inert gas;
   b. Incorporating two ceramic oxide precursors into a fuel gas stream comprising a gaseous fuel and an inert gas, said ceramic oxide precursors being volatile metal compounds which upon combustion form ceramic oxide powder;
   c. Introducing said fuel gas stream containing the ceramic oxide precursors into the other end of said counterflow diffusion flame burner, and
   d. Generating a flame in the region of the counterflow diffusion flame burner where the two opposed gas streams impinge whereby said ceramic oxide precursors are converted to ceramic oxide powder.

2. The process of claim 1 wherein said inert gas is selected from the group consisting of $N_2$, He, Ne, Ar, Kr, Xe, and mixtures thereof.

3. The process of claim 2 wherein the gaseous fuel is selected from the group consisting of $H_2$, methane, ethane, ethylene, acetylene, and mixtures thereof.

4. The process of claim 3 wherein said oxidizing stream is air.

5. A process for the formation of a ceramic oxide powder comprising the steps:
   a. Introducing into the top of a counterflow diffusion flame burner an oxidizing gas stream consisting of $O_2$ and Ar;
   b. Bubbling a small portion of a fuel gas stream consisting of $H_2$ and Ar through a gas washing bottle containing two liquid ceramic oxide precursors, said liquid ceramic oxide precursors being metal compounds which upon combustion form ceramic oxide powder;
   c. Introducing said small portion of the fuel gas stream containing the liquid ceramic oxide precursors and the balance of the fuel gas stream into the bottom of said counterflow diffusion flame burner, and
   d. Generating a flame in the region of the counterflow diffusion flame burner where the two opposed gas streams impinge whereby said liquid ceramic oxide precursors are converted to ceramic oxide powder.

6. The process of claim 5 wherein there is an excess of $O_2$ relative to the $H_2$ fuel.

7. The process of claim 6 wherein said liquid ceramic oxide precursors are $SiCl_4$ and $TiCl_4$.

8. The process of claim 7 wherein the concentration ratio of $SiCl_4$ to $TiCl_4$ is from about 0.05:1 to about 3.0:1.

9. The process of claim 8 wherein the flame temperature range in the particle formation and growth region is about 1000K to about 2400K and the concentration ratio of $SiCl_4$ to $TiCl_4$ is from about 0.05:1 to about 1.5:1 whereby the ceramic oxide powder formed comprises $TiO_2$ particles with attached $SiO_2$ particles.

10. The process of claim 8 wherein the flame temperature range in the particle formation and growth region is about 500K to about 2300K and the concentration ratio of $SiCl_4$ to $TICl_4$ is from about 1:1 to about 3:1 whereby the ceramic oxide powder formed comprises $TiO_2$ particles having a coating layer of $SiO_2$.

11. The process of claim 6 wherein said liquid ceramic oxide precursors are $SiCl_4$ and $GeCl_4$.

12. The process of claim 11 wherein the concentration ratio of $GeCl_4$ to $SiCl_4$ is about 0.05:1 to about 1.7:1.

13. The process of claim 12 wherein the flame temperature is about 1400K whereby the ceramic oxide powder formed comprises $GeO_2$ particles covered with discrete $SiO_2$ particles.

14. The process of claim 6 wherein said liquid ceramic oxide precursors are $Al(CH_3)_3$ and $TiCl_4$.

15. The process of claim 14 wherein the concentration ratio of $Al(CH_3)_3$ to $TiCl_4$ is about 1:1.

16. The process of claim 15 wherein the flame temperature is about 1350K whereby the ceramic oxide powder formed is a mixture of particles of $Al_2O_3$ and $TiO_2$ having a chain-like structure.

17. The process of claim 15 wherein the flame temperature is above about 1550K whereby the ceramic oxide powder formed is a mixture of $Al_2O_3$.$TiO_2$, $Al_2O_3$ and $TiO_2$.

* * * * *